United States Patent
Piehler et al.

(10) Patent No.: US 7,916,385 B2
(45) Date of Patent: Mar. 29, 2011

(54) APPARATUS AND METHODS FOR OPTICAL COMMUNICATION

(75) Inventors: David Piehler, Half Moon Bay, CA (US); Leo Spiekman, Princeton, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 114 days.

(21) Appl. No.: 12/054,121

(22) Filed: Mar. 24, 2008

(65) Prior Publication Data

US 2008/0231945 A1    Sep. 25, 2008

Related U.S. Application Data

(60) Provisional application No. 60/896,683, filed on Mar. 23, 2007.

(51) Int. Cl.
*H04B 10/12* (2006.01)
*H04B 10/06* (2006.01)

(52) U.S. Cl. ............ 359/337.2; 359/337.1; 359/344; 398/160; 398/208; 398/214

(58) Field of Classification Search .......... 359/337.1, 359/337.2, 344; 398/160, 208, 214
See application file for complete search history.

(56) References Cited

U.S. PATENT DOCUMENTS

| | | | | |
|---|---|---|---|---|
| 5,227,908 A * | 7/1993 | Henmi | .................. | 398/192 |
| 5,701,194 A * | 12/1997 | Meli et al. | .................. | 359/341.1 |
| 6,414,787 B2 * | 7/2002 | Lutz et al. | ................ | 359/337.21 |
| 6,809,857 B2 * | 10/2004 | Kang | .................. | 359/337.5 |
| 7,181,097 B2 * | 2/2007 | Caplan et al. | .................. | 385/14 |
| 7,385,754 B2 * | 6/2008 | Ghera et al. | ................ | 359/337.1 |
| 2001/0012147 A1 * | 8/2001 | Lutz et al. | .................. | 359/337.2 |
| 2002/0141694 A1 * | 10/2002 | Caplan et al. | .................. | 385/24 |
| 2002/0154316 A1 * | 10/2002 | Davidson et al. | ............ | 356/477 |

OTHER PUBLICATIONS

Piehler et al. "High sensitivity, multi-rate, multi-band OLT receiver for hybrid 1G/10G passive optical networks", ECOC 2008 (Sep. 21, 2008).*

* cited by examiner

*Primary Examiner* — Eric Bolda

(74) *Attorney, Agent, or Firm* — Kaplan Gilman & Pergament LLP

(57) ABSTRACT

An optical circuit is disclosed, which may include a semiconductor optical amplifier (SOA); an optical filter operable to filter light emerging from the SOA; and a PIN for converting the light output from the optical filter into an electrical signal, wherein the gain profile of the optical filter is configured to maximize throughout of signal energy within a predetermined wavelength range (in-band), and to impose an insertion loss ($L_{oob}$) of less than 20 dB on signal energy outside the predetermined wavelength range.

14 Claims, 5 Drawing Sheets

(PRIOR ART)

APPARATUS AND METHODS FOR OPTICAL COMMUNICATION

CROSS-REFERENCE TO RELATED APPLICATIONS

This application claims the benefit of U.S. Provisional Patent Application Ser. No. 60/896,683, filed Mar. 23, 2007, entitled "Optical Component and Method of Fabrication", the entire disclosure of which is hereby incorporated by reference herein.

BACKGROUND OF THE INVENTION

Passive optical networks (PONs) have been deployed worldwide. A network roll-out requires significant investment, and once constructed, should be able to be upgraded economically. Recent activities in both the Full Service Access Network (FSAN) organization, and the IEEE 802.3av 10G-EPON (Ethernet Passive Optical Network) study group have studied next-generation access networks. Both organizations have considered PONs (Passive Optical Networks) operating at 10Gb/s (10 Gigabits-per-second—"10G communication") rates. It would be desirable to have an upgrade which can leverage the existing infrastructure without requiring outside plant adjustment or changes in customer premises equipment.

The 10G-EPON group has specifically addressed the issue of "coexistence" of a new 10G-EPON standard with an existing GE-PON (Gigabit Ethernet Passive Optical Network). By using a combination of Wavelength Division Multiplexing (WDM) and Time-Division Multiple Access (TDMA), it is possible for both a legacy 1G PON and new 10G PON to operate on the same network.

This scheme is illustrated schematically in FIG. 1. Network 100 may include 1G/10G Optical Line Terminal (OLT), dual rate polarization mode dispersion (PMD) device 110, 1G Optical Network Unit (ONU) 104, second 1G ONU 106, and 10G ONU 108. OLT 102 includes a Media Access Control (MAC) which controls both the legacy 1G ONUs 104, 106 and new 10G ONU 108.

A large link budget in the downstream direction is not a problem since the OLT 102 can use either a high power Distributed Feedback Laser (DFB) laser or a DFB laser in combination with an SOA (Semiconductor Optical Amplifier) to meet the link budget. In both the specifications for (Ethernet Passive Optical Networks—EPON—IEEE 802.3ah) and for (Gigabit capable Passive Optical networks—GPON—ITU-T G.984), the upstream wavelength is defined to range between 1260 and 1360 nm (1310+/−50 nm) and the downstream wavelength is defined to lie within the 1480-1500 nm band. (1490+/−10 nm). With regard to 10G communication, the 1571 nm wavelength was the working wavelength chosen by the IEEE 10G-EPON study group (IEEE 802.3av) for 10G downstream communication, that is communication from OLT 102 to various 10G ONUs, such as ONU 108.

Thus, one limiting performance factor in the system of FIG. 1 occurs in the upstream communication direction (that is, toward the OLT 102). The optical powers of the legacy 1G ONU 104, 106 transmitters are fixed, while it is desirable to use a lower power transmitter in the 10G ONU 108 to keep system costs to a minimum. The challenge for the OLT 102 receiver is meeting a large (e.g. 29 dB) link budget for both the 1G and 10G data communication streams. Legacy 1G ONUs 104, 106 must be used, and the 1G signals operate over a specified wavelength range of 1260-1360 nm (nanometers), without Forward Error Correcting (FEC), in the upstream direction (toward the OLT 102). Since the 10G ONU PMD is not yet defined, the wavelength may be specified with more precision within the 1260-1360 window, and FEC may be available to meet required link budgets. Some existing approaches are discussed below.

There are two basic approaches to using an Avalanche Photo-Diode (APD) as a dual-rate receiver, which are illustrated in FIGS. 2 and 3, respectively. One goal when using an APD at both 1G and 10G rates is optimizing the bandwidth of the Trans-Impedance Amplifier (TIA).

FIG. 2 shows network 200 which includes APD 202, resistance 204, TIA 206, 1G Band Pass Filter (BPF) 208, and 10G BPF 210. The resistance value "R" of resistance 204 is the resistance across the TIA 206. The bandwidth of the TIA 206 will be proportional to 1/R while the (thermal noise current)$^2$ of the receiver will also be proportional to 1/R. If the bandwidth of the TIA 206 is large enough to enable throughput of both 10 Gb/s (10G) and 1.25 Gb/s (1G) signals, then the thermal noise current of TIA 206 will be $(10/1.25)^{1/2}$, or 4.5 dB higher than under ideal circumstances for the 1.25 Gb/s signal.

For thermal-limited receivers (such as PIN, and APD to a lesser extent), the receiver sensitivity is proportional to 1/(thermal noise current). With such a static TIA, the 1G sensitivity in the dual-rate receiver will be 4.5 dB lower (i.e. worse) than in an APD-TIA combination optimized for 1G operation.

One potential solution to minimize this penalty is to vary the value of "R" in time such that the TIA 206 bandwidth is optimized for either 1G or 10G traffic. However, this approach adds significant complexity, as the receiver must implement a high-speed dynamic TIA 206 as well as communicate with the MAC in OLT 102 to track the bit-rate of the incoming signals.

Another approach is to use two separate APDs, as shown in FIG. 3. FIG. 3 is a block diagram of network 300 that includes a 3 dB optical splitter 302 (labeled with "3 dB" in FIG. 3), APDs 304, 306, a 1G TIA and BPF 308, and a 10G TIA and BPF 310. However, with this approach, performance suffers due to the insertion loss of the optical splitter 302, which effectively halves the power that is directed along each of the two branches to the right of splitter 302.

In the following, it is noted that sensitivities having measurements in "dBm" having larger negative numbers are most beneficial for operation of an optical communication network.

Good APDs provide −34 dBm sensitivity with a Bit Error Rate (BER) of $10^{-12}$ at 1G and −25 dBm sensitivity at 10G. A single APD having the foregoing specifications, if used as a dual-rate receiver, in the network of FIG. 2 would yield a sensitivity of −29.5 dBm at 1G and −25 dBm at 10G, while providing −31 dBm and −22 dBm sensitivities for the 1G and 10G data streams, respectively, if deployed within the network shown in FIG. 3.

The sensitivity disparities between the 1G and 10G data communication streams described above are undesirable. The performance of the networks of FIGS. 2 and 3 could result in the 1G communication operating well, and the 10G communication malfunctioning to an unacceptable degree. Accordingly, there is a need in the art for an improved system and method for receiving data at multiple data rates.

SUMMARY OF THE INVENTION

According to one aspect, the invention is directed to an optical circuit which may include a semiconductor optical amplifier (SOA); an optical filter operable to filter light emerging from the SOA; and a PIN for converting the light output from the optical filter into an electrical signal, wherein the gain profile of the optical filter is configured to maximize throughout of signal energy within a predetermined wavelength range (in-band), and to impose an insertion loss ($L_{oob}$) of less than 20 dB on signal energy outside the predetermined signal wavelength range, wherein signal energy at wavelengths outside the predetermined wavelength range is out of band signal energy.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIGS. 8A, 8B, 8C, 8D, 8E, and 8F are plots of sensitivity measurements obtained using the circuit of FIG. 7, in which FIG. 8A is a plot for a 1G signal without the use of a filter, FIGS. 8B and 8C are plots for a 1G signal with simulated soft filters, FIG. 8D is a plot for a 10G signal with no filter; FIG. 8E is a plot for a 10G signal with a simulated soft filter; and FIG. 8F is a plot for a 10G signal with a notch filter.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 4:
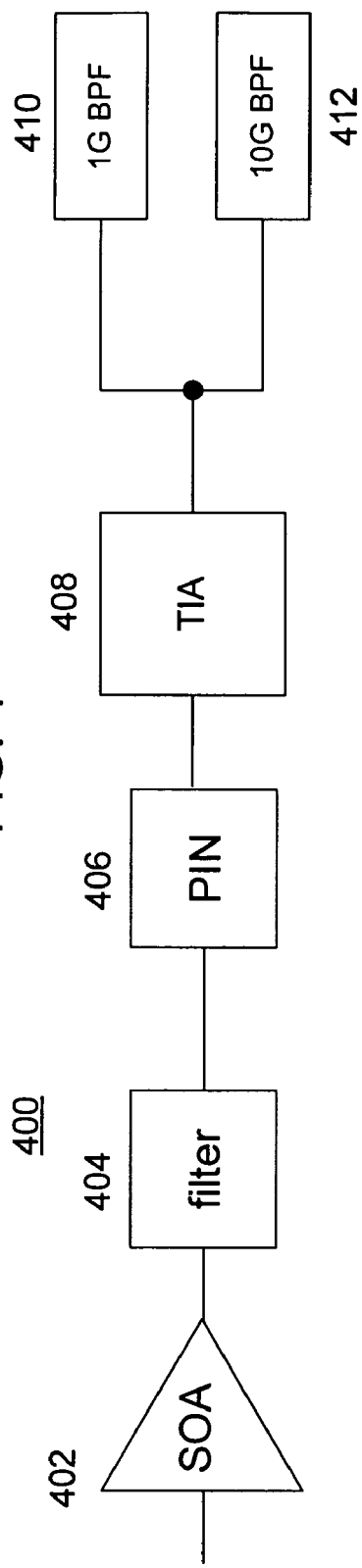
FIG. 4 is a block diagram of an optical circuit in accordance with an embodiment of the present invention.

FIG. 4 is a block diagram of an optical circuit 400 in accordance with an embodiment of the present invention. Circuit 400 may include SOA 402, filter 404, PIN photodiode 406, TIA 408, 1G band-pass filter 410, and/or 10G band-pass filter 412.

SOA 402 is a semiconductor optical amplifier, preferably providing amplification for light having a range of wavelengths from 1260 to 1360 nm. However, SOA 402 is not limited to the providing amplification for the stated range of wavelengths. Filter 404 is an optical filter. PIN 406 is a photodiode. TIA 408 is preferably a single, static trans-impedance amplifier. BPFs 410 and 412 are band-pass filters configured to process 1G and 10G data communication, respectively.

Figure 1:
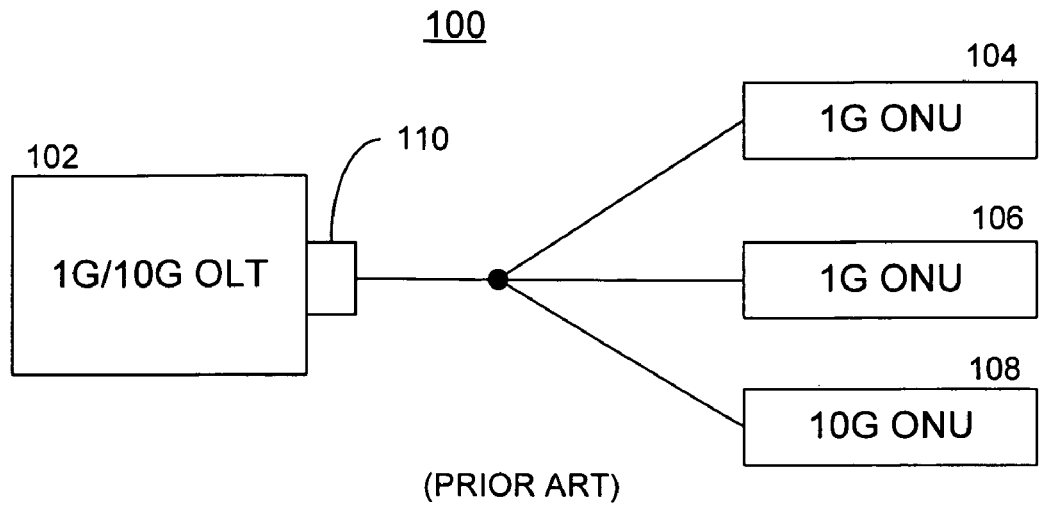
FIG. 1 is a block diagram of a new 10G (10 Gigabit/second) passive optical network overlaid on, and co-existing with legacy 1G (one gigabit/second) passive optical network.

While shown in one possible arrangement, the invention is not limited to the particular arrangement shown. For instance, the optical amplifier and filter may each be located at any location within an optical network that includes optical circuit 400. Both filter 404 and amplifier 402 could be placed between a splitter and PMD 110 (FIG. 1) outside of a central office (in the outside plant). In this case, the filter 404 and the amplifier 402 would be a product in the same box.

Alternatively, the filter could be at the receiver in the central office (CO), and the optical amplifier 402 could be outside. In other alternative embodiments, the optical amplifier 402 and filter 404 could have other optical element (boxes) between them such as optical switches, splitters, and/or optical monitor ports.

The following is an alternative approach to providing a multiple data rate receiver which employs a combination of SOA 402, filter 404, and PIN 406 to achieve acceptable sensitivity for both 1G rate and 10G rate optical communication. Effectively, the circuit of FIG. 4 enables a tradeoff to be effected between the sensitivity of the 1G communication and the 10G communication. More specifically, some amount of 1G sensitivity may be sacrificed to improve 10G sensitivity to an acceptable level. The various design choices are shown in FIG. 6.

Figure 2:
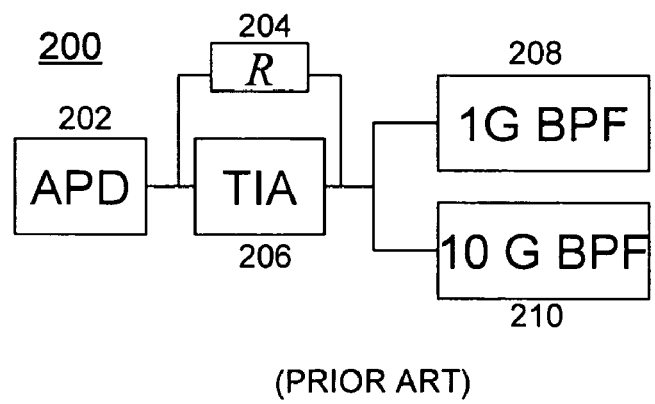
FIG. 2 is a block diagram of a network using a single TIA and a resistor connected in parallel across the TIA.

In one embodiment, the circuit of FIG. 4 preferably enables a single, static TIA 408 to process a signal spanning a wavelength range incorporating both 1G and 10G signal energy. This differs from existing optical receiver circuits as described above. The existing circuit of FIG. 2 employs a variable resistor to vary the characteristics of TIA 206 to accommodate either 1G or 10 g signals. The TIA 206 of circuit 200 of FIG. 2 is therefore not "static." The separate TIAs within circuits 308 and 310, of circuit 300 of FIG. 3, separately accommodate 1G signals and 10G signals, respectively. Thus, circuit 300 is not able to use a single TIA to process a signal including signal energy for both 1G and 10G communication.

Figure 5:
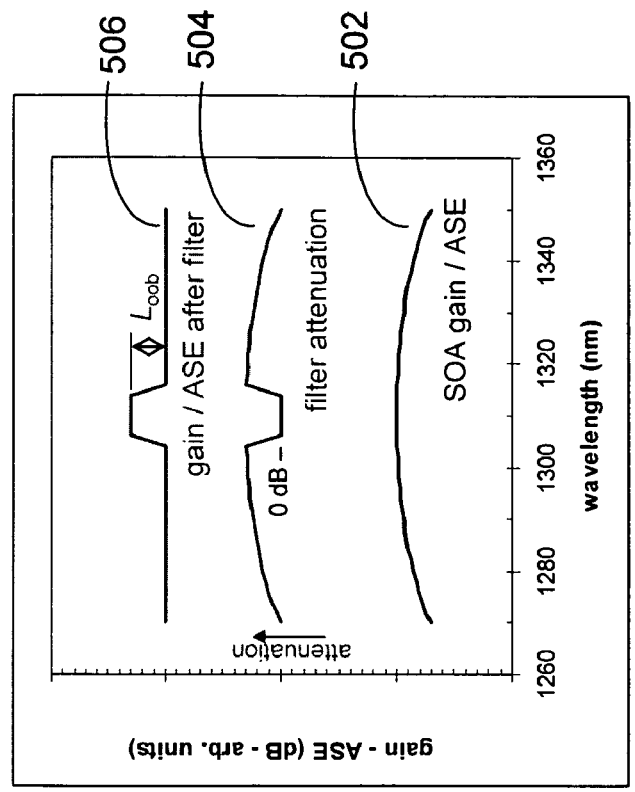
FIG. 5 is a plot of gain versus wavelength occurring at various points along the optical circuit of FIG. 4.
Figure 6:
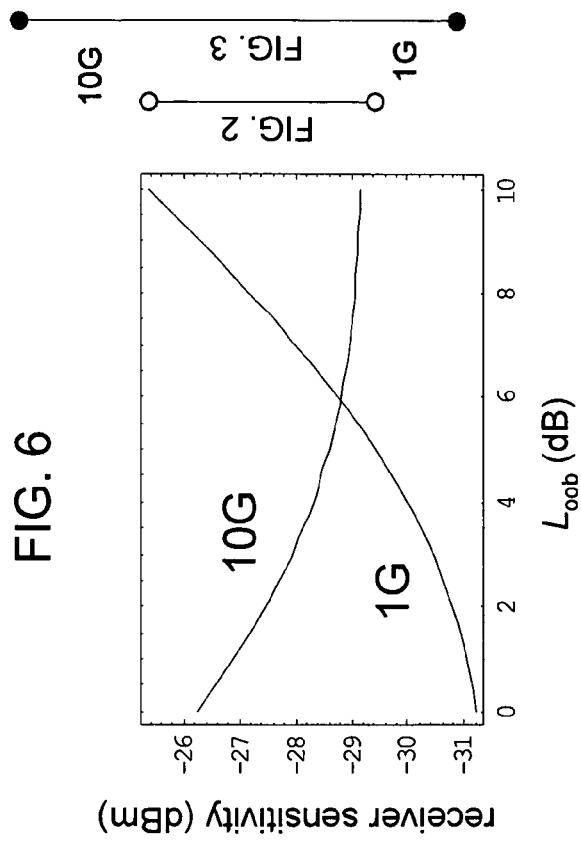
FIG. 6 is a graph of receiver sensitivity plotted against out-of-band Loss for 1G and 10G communication obtainable using the optical circuit of FIG. 4 in accordance with an embodiment of the present invention.

FIGS. 5 and 6 are described below, since reference is made thereto in the discussion of the operation of FIG. 4. FIG. 5 is a graph of Amplified Spontaneous Emission (ASE) gain plotted against wavelength occurring at various points in the optical circuit of FIG. 4. FIG. 6 shows calculated receiver sensitivity at 10-12 BER as a function of $L_{oob}$. Parameters: hυ=−155.3 dBm/s (at 1310 nm); η=0.85 A/W, $i_{th}$=18 pA/√Hz, Be(1G)=0.875 GHz, Be(10G)=7.0 GHz, SOA noise figure=7 dB, SOA gain=20 dB, filter width=12 nm, transmitter extinction ratio=10 dB. Hollow/solid circles on the vertical lines at the right of FIG. 6 show the 1G/10G sensitivities for the conventional architectures illustrated in FIGS. 2 and 3, respectively, as illustrated at the right of FIG. 6.

One possible drawback to using SOA 402 as a preamplifier in circuit 400 is that although the 10G ONU transmitter wavelength can be specified within a narrow range (by using an un-cooled DFB laser, for example), the legacy 1G ONT transmitter is specified more broadly. Specifically, the 1G signal is indicated as lying within a 100 nm window, between 1260 nm and 1360 nm. Accordingly, the use of a narrow band noise blocking filter in this situation is undesirable since the 1G signal energy would be blocked.

In the embodiment of FIG. 4, a "soft" filter 404 is proposed as a solution to this problem, as illustrated in FIGS. 4 and 5. By way of further introduction to FIG. 5, plot 502 shows the gain of SOA 402. Plot 504 shows the attenuation imposed by filter 404. Plot 506 shows the resulting gain of the combination of the SOA 402 and the filter 404.

After the "soft filter" 404, the net gain is G within the 10G wavelength band (the notch in plot 506) and G-$L_{oob}$ outside of the band. The choice of the $L_{oob}$ value enables an optimization of the relative sensitivity for the 10G and the 1G signals for the dual-rate receiver, as illustrated in FIG. 6.

Existing notch filters commonly impose insertion losses of about 40 dB or more on out-of-band signals, thus minimizing the throughput of signal energy outside a defined band. In this situation, the use of such a filter would essentially eliminate the 1G signal energy throughput which is not desired. Instead, the soft filtering of filter 404 herein still maximizes the throughput of signal energy within the 10G band (which may be within a narrow range of wavelength on either side of 1310 nm). However, filter 404 preferably optimizes rather than minimizes the throughput of signal energy outside the 10G signal energy band, but still within the range of 1260 to 1360 nm.

For example, the insertion loss of signal energy outside the "notch" or band intended to correspond to 10G signal energy, but still within the 1260 to 1360 nm wavelength range may be set lower than 40 dB, such as at 20 dB, 15 dB, 10 dB, or still lower, if beneficial to an embodiment of the invention.

In addition to providing a notch to provide zero or minimum attenuation within the 10G signal energy range, and providing moderated attenuation (insertion loss) for signal energy outside this band ($L_{oob}$ values are shown in FIG. 6), this embodiment of filter 404 may provide a curved attenuation profile, as shown in FIG. 5. The curved portion of filter 404 attenuation profile 504 may be operable to counteract at least a portion of the curve in the gain profile 502 of SOA 402 shown in FIG. 5. The product of the SOA gain 502 and the filter attenuation 504 is shown as curve 506, which represents the gain in effect in circuit 400 in between filter 404 and PIN 406, and thus at the input to PIN 406.

FIG. 6 illustrates receiver sensitivity for 1G and 10G upstream communication for a range of values of out-of-band Loss ($L_{oob}$). At right, the receiver sensitivities for 1G and 10G communication of the circuits of FIG. 2 and FIG. 3 are shown, and are labeled with the figure numbers illustrating the respective circuits.

Effectively, the graph of FIG. 6 may be employed as a design-phase tool to enable an optical circuit designer to selected the best available combination of 1G and 10G receiver sensitivity values for a given package of equipment. The optical equipment used for FIG. 6 was identified above. It will be appreciated that the 10G and 1G curves shown in FIG. 6 may vary with varying performance characteristics of the optical equipment of FIG. 4.

Figure 3:
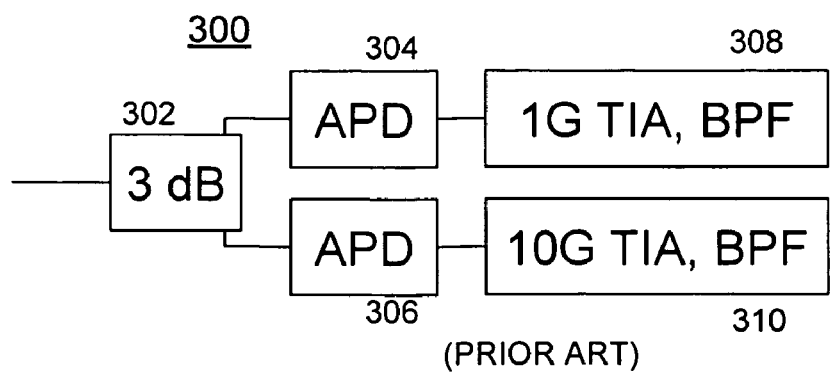
FIG. 3 is a block diagram of a network that splits an incoming signal into two paths, with each path having a separate APD, TIA, and band-pass filter.

The FIG. 2 and FIG. 3 performance data (shown at the right of FIG. 6) show that the 1G communication performance tends to fall within an acceptable range. However, the circuits of FIG. 2 and FIG. 3 tend to suffer from undesirably poor 10G sensitivity. The curves in the main portion of FIG. 6 show how the 1G and 10G receiver sensitivities vary with $L_{oob}$. The value of $L_{oob}$ may be varied through the selection of the attenuation characteristics of filter 404, one example of which attenuation is shown with curve 504 of FIG. 5.

Again directing attention to FIG. 6, it may be seen that as $L_{oob}$ increases from 0 to 10 the sensitivity of 10G communication gets progressively better, and the sensitivity of 1G communication gets progressively worse. Thus, varying the filter attenuation characteristics of filter 404 effectively enables trading off 1G sensitivity for 10 sensitivity. More specifically, 1G sensitivity may be worsened within acceptable bounds in order to bring 10G sensitivity within an operationally acceptable range. In the embodiment shown in FIGS. 4 and 6, an $L_{oob}$ value of about 6 dB provides a desirable combination of 1G and 10G sensitivity values. However, other $L_{oob}$ values may be selected.

Thus, in one embodiment, upon viewing the design-phase graph of FIG. 6, the filter attenuation 504 of filter 404 over the wavelength range shown in FIG. 5 could be selected so as to provide about 6 dB of attenuation for signal energy outside the "notch" region, which notch area may correspond to the wavelength range of 10G communication signal energy. However, it will be appreciated that with other equipment and other signal types, the optimal $L_{oob}$ value could be greater or less than the 6 dB shown in FIG. 6.

It is clear that a better range of 10G sensitivities are available using the circuit of FIG. 4, compared to the APD architectures of FIG. 2 and FIG. 3. In addition, the use of the SOA 402 as a preamplifier may enable the PIN 406 to operate in the RIN (Relative Intensity Noise)-limited noise regime. Thus, the PIN 406 is preferably insensitive to thermal noise. Consequently, there is no dual-rate penalty.

Figure 7:
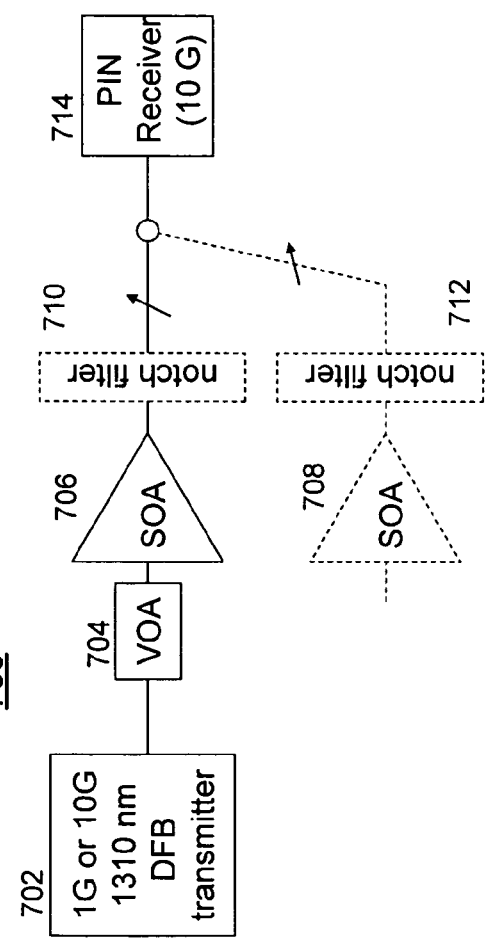
FIG. 7 is a test setup in accordance with an embodiment of the present invention.
Figure 8A:
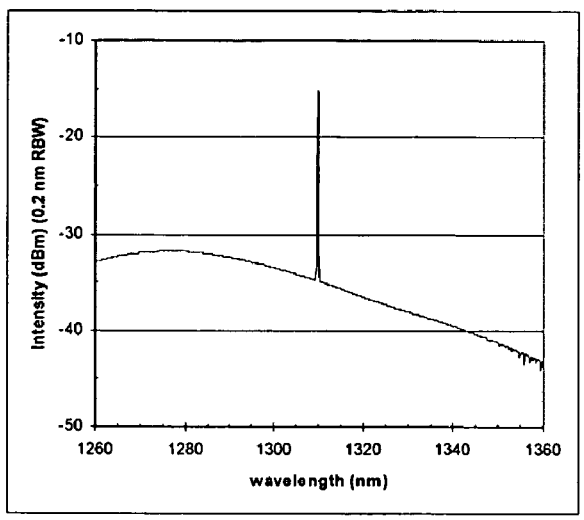
Figure 8B:
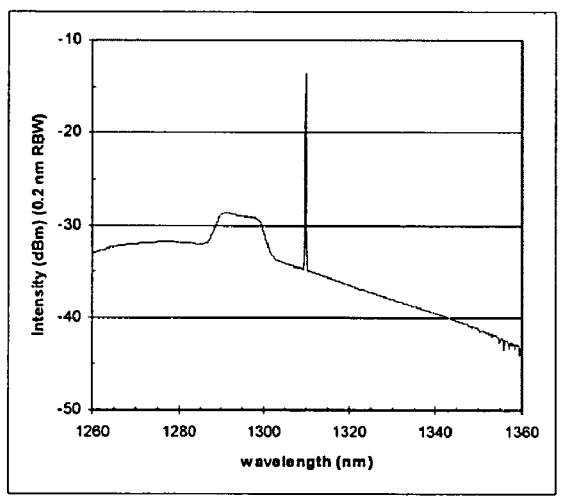
Figure 8C:
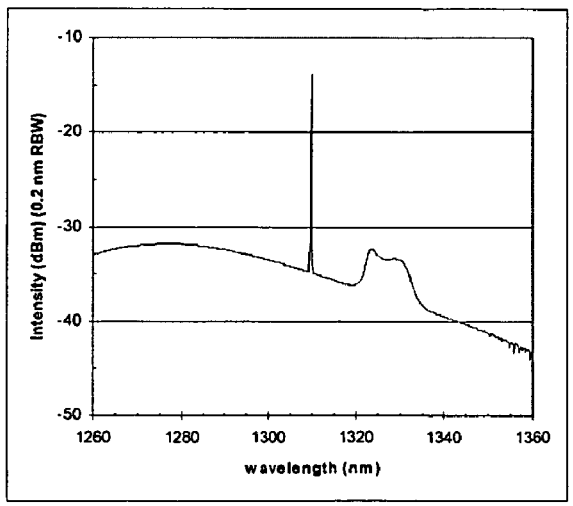
Figure 8D:
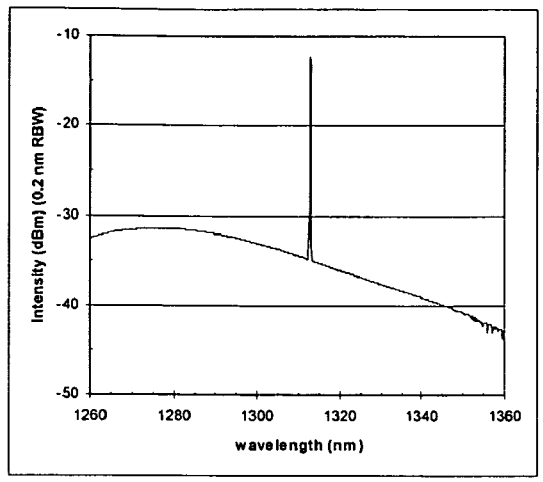
Figure 8E:
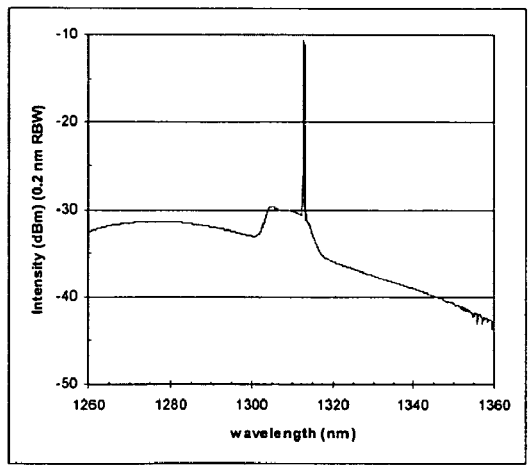
Figure 8F:
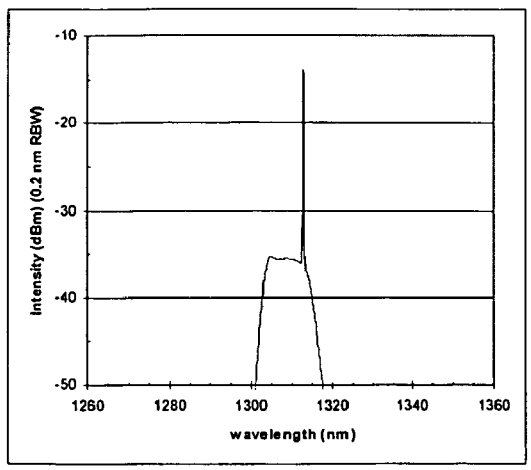

An experimental setup is illustrated in FIG. 7. A simulation was provided by using a pair of SOAs as illustrated in FIGS. 7-8. FIG. 8 shows the observed spectrum at the PIN photodiode 714. The SOAs were model SOAM-02P426 manufactured by Alphion Corporation. The 10G (1312 nm) transmitters 702 and receiver 714 were from a commercial multi-protocol 10 km XFP transceiver with a measured extinction ratio of 4.7 dB, while the (1310 nm) 1G transmitter was from a commercial GE-PON ONU transceiver with a measured extinction ratio of 16 dB. Various optical filters 710, 712 were used in the 1288-1300, 1302-1314, and 1320-1232 nm (3 dB bandwidth) ranges. Receiver 714 sensitivities were calculated taking into account the overall shape of the measured ASE profiles shown in FIG. 8D.

The sensitivity measurements taken in the situation shown in FIG. 8 (parts A-F) agreed with calculation with a standard deviation of less than 1 dB.

The above has demonstrated that with the use of an appropriate optical filter along with an SOA and PIN photodiode, one can create a dual-rate, multi-band OLT receiver that provides higher sensitivity than APD-based receivers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical receiver, comprising:
   an optical amplifier; and
   an optical filter operable to filter light emerging from the optical amplifier,
   wherein the filter is constructed such that the gain profile is curved over most of a wavelength window corresponding to 1G signal energy, and wherein the filter gain profile includes a notch region having a wavelength range corresponding to a range of communication of 10G communication, such that signal attenuation of the filter within the notch region is substantially less than attenuation outside the notch region but within the 1G signal wavelength window.

2. The optical receiver of claim 1 wherein the 1G signal energy wavelength window is substantially between 1260 nm and 1360 nm.

3. The optical receiver of claim 2 wherein the notch region of the filter is centered at about 1310 nm.

4. The optical receiver of claim 3 wherein the notch region of the filter has a width of about 12 nm.

5. The optical receiver of claim 1 wherein the disparity in attenuation ($L_{OOB}$) between signal energy within the notch region and signal energy outside the notch region is between 4 dB and 8 dB.

6. The optical receiver of claim 1 wherein the disparity in attenuation ($L_{OOB}$) between signal energy within the notch region and signal energy outside the notch region is about 6 dB.

7. The optical receiver of claim 1 further comprising a photodiode to receive optical energy from the optical filter and output an electrical signal.

8. The optical receiver of claim 7 further comprising a single, static trans-impedance amplifier (TIA) to amplify the electrical signal output from the photodiode.

9. A method, comprising:
receiving an optical signal at an optical receiver;
amplifying the optical signal using an optical amplifier;
filtering the amplified optical signal such that the gain profile is curved over most of a wavelength window corresponding to 1G signal energy, and
providing a notch region, within the filter gain profile, the notch having a wavelength range corresponding to a range of communication of 10G communication, such that signal attenuation of the filter within the notch region is substantially less than attenuation outside the notch region but within the 1G signal wavelength window.

10. The method of claim 9 wherein the 1G signal energy wavelength window is substantially between 1260 nm and 1360 nm.

11. The optical receiver of claim 10 wherein the notch region of the filter is centered at about 1310 nm.

12. The method of claim 11 wherein the notch region of the filter has a width of about 12 nm.

13. The method claim 9 wherein the disparity in attenuation ($L_{OOB}$) between signal energy within the notch region and signal energy outside the notch region is between 4 dB and 8 dB.

14. The method of claim 9 wherein the disparity in attenuation ($L_{OOB}$) between signal energy within the notch region and signal energy outside the notch region is about 6 dB.

* * * * *